(12) United States Patent
Miller (10) Patent No.: US 7,075,418 B2
(45) Date of Patent: Jul. 11, 2006

(54) MULTIBAND ANTENNA SYSTEM WITH TIRE PRESSURE SENSOR

(75) Inventor: Paul E. Miller, Sprint Lake, MI (US)

(73) Assignee: R.A. Miller Industries, Inc., Grand Haven, MI (US)

( * ) Notice: Subject to any disclaimer, the term of this patent is extended or adjusted under 35 U.S.C. 154(b) by 155 days.

(21) Appl. No.: 10/710,789

(22) Filed: Aug. 3, 2004

(65) Prior Publication Data

US 2006/0028332 A1 Feb. 9, 2006

(51) Int. Cl.
*B60C 23/00* (2006.01)

(52) U.S. Cl. ............ 340/447; 340/538.14; 340/538.16; 340/539.1

(58) Field of Classification Search ................ 340/442, 340/447, 538.14, 538.16, 539.1, 539.21, 340/539.23; 343/711, 713, 879; 701/29, 701/33

See application file for complete search history.

(56) References Cited

U.S. PATENT DOCUMENTS

| 6,774,779 | B1 * | 8/2004 | Lin ............................ 340/447 |
| 6,809,692 | B1 * | 10/2004 | Puente Baliarda et al. . 343/713 |
| 6,914,523 | B1 * | 7/2005 | Munch et al. ............... 340/447 |
| 6,988,026 | B1 * | 1/2006 | Breed et al. .................. 701/29 |

* cited by examiner

Primary Examiner—Van T. Trieu
(74) Attorney, Agent, or Firm—McGarry Bair PC (57) ABSTRACT

A multiband antenna system includes a multiband antenna adapted to receive signals in a given frequency range, such as CB, and a trap to isolate signals in the tire pressure monitoring frequency ranges so that when it is mounted to the exterior of a vehicle in conventional manner, it will optimally receive signals sent from tire pressure monitors in the wheels. The system includes a multiplexer circuit that connects to tire pressure monitoring apparatus and isolates the tire pressure monitoring frequencies from CB frequencies. The antenna and multiplexer circuits are capable of simultaneously handling other frequencies as well such as AM/FM.

12 Claims, 6 Drawing Sheets

Fig. 8

MULTIBAND ANTENNA SYSTEM WITH TIRE PRESSURE SENSOR

FIELD OF THE INVENTION

The invention pertains to antennas and multiplexers, and more particularly to antennas and multiplexers for use with receiving apparatus operating in multiple frequency ranges, including frequencies for tire pressure sensors

PRIOR ART

It is recognized that maintaining proper tire pressure in commercial vehicles is important for safety and performance. This is especially true for the ubiquitous truck/semi-trailer combinations having 18 working tires. Some vehicles have as many as 42 working tires while in use. Increasingly, trucks, and truck/trailer combinations are including onboard tire pressure monitoring systems that measure tire pressure in real time and transmit low power RF signals to receivers in the truck cab so that the driver can monitor the pressure in the tires. Some systems enable identification of pressure in any given tire. Tire pressure monitoring systems typically transmit at frequencies of about 315–433 MHz. The benefits of such systems to safety and performance are apparent.

However, signal reception has proven to be problematic. Wireless transmitters at each tire transmit a signal for reception by a single antenna located in the truck cab. Frequently the receive antennas are not optimally designed for the frequency ranges of the tire sensor transmitters. Also, the location of the receive antennas tends to inhibit accurate reception. Because the signals are low power, the transmit distance is far for the relative weakness of the transmit signals, and hidden placement (often within metal enclosures) degrades already inadequate performance.

Multiband antenna systems that simultaneously receive and process signals in various combinations of the AM, FM, CB, WB, and cellular telephone frequency ranges are known, as for example, in commonly assigned U.S. Pat. Nos. 5,734,352; 6,107,972; 6,297,711; 6,396,365; and 6,384,696. These antennas are typically physically placed outside the cab and consequently are not subject to the limitations of present placement of tire pressure sensor receivers. But none has accommodated tire pressure sensor frequencies and the already crowded circuits for existing multiple frequency ranges make it difficult to assimilate yet another frequency range.

SUMMARY OF THE INVENTION

These and other problems are solved by the present invention of a multiband radio antenna system for installation on an automotive vehicle that is uniquely adapted to handle multiple RF signals, including signals from tire pressure monitors in wheels. In one aspect of the invention the system includes a multiband antenna comprising a terminating end connectable to transmitter/receiver apparatus and a distal end opposite the terminating end. A solid core wire extends between the terminating end and the distal end and has an overall electrical length equivalent to one-quarter wavelength of a frequency in a predetermined frequency range lower than a tire pressure monitoring frequency range. A tire pressure monitoring frequency self-resonant circuit section is disposed a predetermined distance from the terminating end such that a portion of the solid core wire between the tire pressure monitoring frequency self-resonant circuit section and the terminating end has an electrical length equivalent to one-quarter wavelength in the tire pressure monitoring frequency range.

The tire pressure monitoring frequency self-resonant circuit section comprises a portion of the solid core wire formed into a multiple-turn coiled section that has a signal blocking impedance at a tire pressure monitoring frequency. The blocking impedance is defined by an inductive component provided by turns of the respective multiple-turn coiled section and a capacitive component provided by stray capacitance across the turns of the respective multiple-turn coiled section. Thus, when the antenna is connected to a multiplexer on a vehicle equipped with a wireless tire pressure monitor apparatus transmitting in the tire pressure monitoring frequency range, the antenna will optimally receive and conduct signals in both the tire pressure monitoring frequency range and the lower frequency range. Preferably, the multiple-turn coiled section of the tire pressure monitoring frequency self-resonant circuit section comprises 7–10 turns.

The antenna can have a second self-resonant circuit section disposed between the distal end and the tire pressure monitoring frequency self-resonant circuit section such that a portion of the solid core wire between the second self-resonant circuit section and the terminating end has an electrical length equivalent to one-quarter wavelength in the FM frequency range.

The antenna can also have a layer of conductive material disposed internal of the multiple-turn coiled section of the tire pressure monitoring frequency self-resonant circuit section and a layer of dielectric material disposed between the layer of conductive material and the multiple-turn coiled section. In this case, the multiple-turn coiled section of the tire pressure monitoring frequency self-resonant circuit section preferably comprises 3–5 turns.

In another aspect of the invention, the system comprises an antenna as described above and transmitter/receiver apparatus comprising CB radio apparatus and tire pressure monitoring apparatus and a multiplexer circuit for selectively coupling the antenna to the CB radio apparatus and the tire pressure monitoring apparatus. The multiplexer circuit has an input conductor connected to the antenna, a first output conductor for connection to the CB radio apparatus and a second output conductor for connection to the tire pressure monitoring apparatus. The multiplexer circuit further has at least one L-C circuit connected between the input conductor and the first output conductor and between the first and second output conductors to effectively isolate signals in the CB frequency range and the tire pressure monitoring frequency range from each other.

The antenna system can also have a second self resonant circuit section disposed between the distal end and the tire pressure monitoring frequency self-resonant circuit section such that a portion of the solid core wire between the second self-resonant circuit section and the terminating end has an electrical length equivalent to one-quarter wavelength in the FM frequency range. Also, the multiplexer circuit can have a third output conductor for connection to AM/FM radio apparatus and a series L-C circuit connected between the input conductor and the first output conductor providing blocking impedance to signals in the AM/FM frequency range.

In this case, the multiplexer preferably has a parallel L-C circuit connected between the input conductor and the third output conductor for blocking signals in the CB frequency range and an additional inductor connected in series with the parallel L-C circuit for blocking signals in the tire pressure monitoring frequency range.

The antenna system can also have a second antenna identical to the first. If so, then the second antenna is connected to the multiplexer circuit via a second input conductor with an inductor connected between the second antenna and the respective input conductor for blocking signals in the tire pressure monitoring frequency range from the second antenna.

In another aspect, the invention includes a multiplexer circuit for selectively coupling an antenna to CB radio apparatus and to FM radio apparatus and to tire pressure monitoring apparatus. The multiplexer circuit includes an input conductor for connection to the antenna, a first output conductor for connection to a CB radio apparatus, a second output conductor for connection to a AM/FM radio apparatus, and a third output conductor for connection to a tire pressure monitoring apparatus. A series L-C circuit is connected between the input conductor and the first output conductor. It includes a first inductor and a first capacitor connected in series and provides a blocking impedance to signals in the AM/FM range.

Preferably, the multiplexer circuit has a parallel L-C circuit connected between the input conductor and the second output conductor for blocking signals in the CB frequency range and an additional inductor connected in series with the parallel L-C circuit for blocking signals in the tire pressure monitoring frequency range. Also preferably, the multiplexer circuit has a capacitor connected between the input conductor and the third output conductor for blocking lower frequency signals in the CB and FM frequency ranges.

BRIEF DESCRIPTION OF THE DRAWINGS

An illustrative embodiment of the invention is described below with reference to the drawings in which.

DETAILED DESCRIPTION

Figure 1:
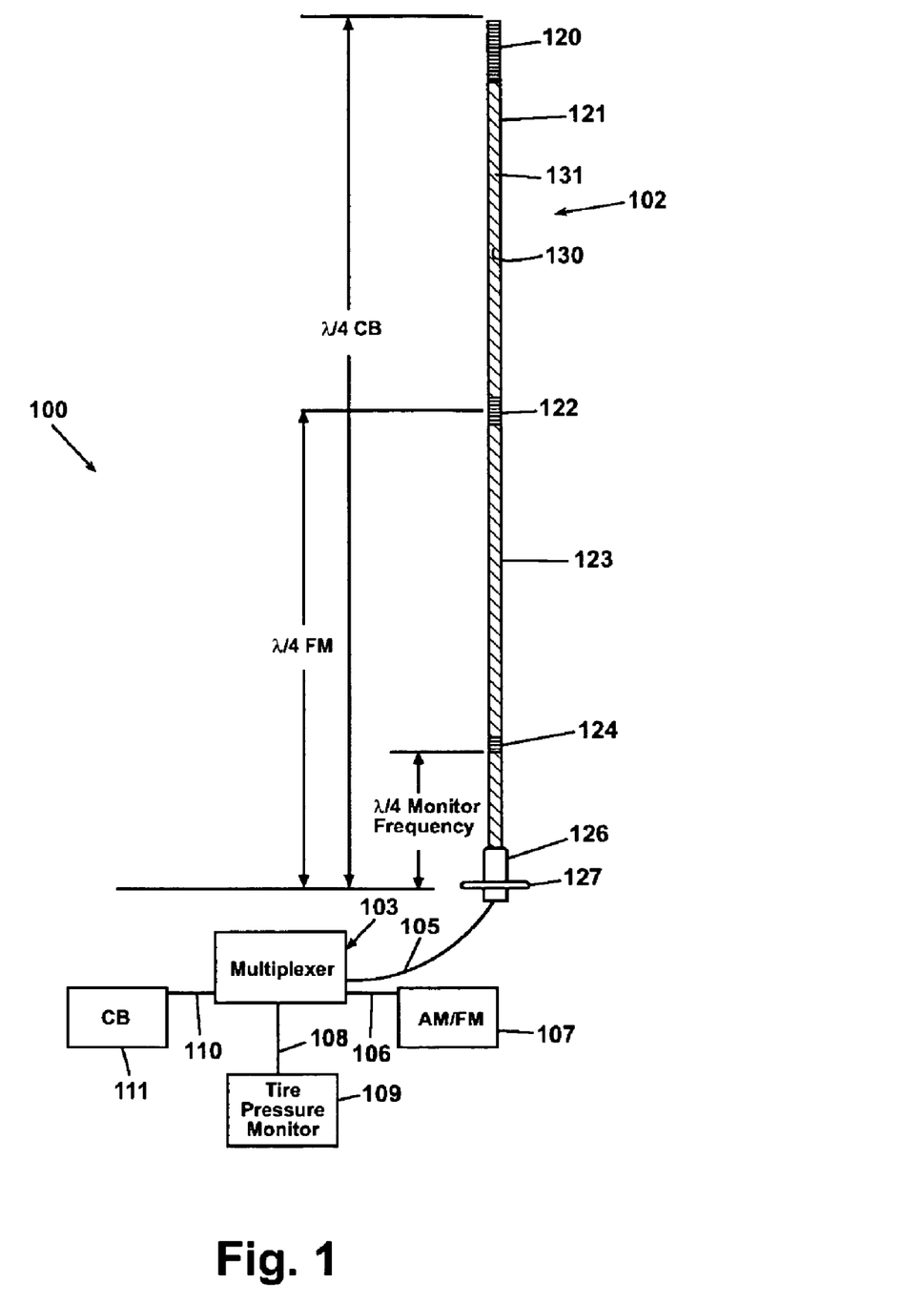
FIG. 1 is a diagrammatic representation of a multiband antenna system incorporating the principles of the invention.

FIG. 1 shows an antenna system 100 comprising a multiband antenna 102 connected to a multiplexer 103 via conductor 105. The multiplexer 103 serves to connect the antenna 102 to multiple receivers of different purposes. In a first embodiment according to the invention, an existing multiplexer as illustrated in commonly owned U.S. Pat. No. 6,107,972 is modified to accommodate a tire pressure monitoring system by removing a circuit for a typically underused or non-used system. It has been found that cellular telephones have advanced enough to virtually eliminate the need for separate vehicle antennas. Consequently, there is often little need for the cellular telephone structure disclosed in the '972 patent.

Thus, in an exemplary embodiment according to the present invention, an AM/FM receiver 107 can be connected to the multiplexer 103 via conductor 106, a CB transceiver 111 via conductor 110, and a tire pressure monitoring receiver 109 via conductor 108. The antenna 102 is mounted by means of a mounting nut 126 on a bracket 127 which may, for example, be a side mirror mounting bracket of a truck.

The antenna system 100 will normally be adapted to accommodate the tire pressure monitoring receiver 109 and at least one other receiver of frequencies less than the typical tire pressure monitoring range. For CB, for example, the overall antenna is preferably on the order of 54 inches in length. The antenna comprises an enamel coated conductive antenna wire 130 wound around an essentially cylindrically shaped core 131. The core 131 may be a solid core of fiberglass or like material having a diameter of ¼ inch. The wire of the antenna extends continually from the top of the core 131 to the mounting nut 126 where the antenna is connected to the multiplexer 103 via the conductor 105. The wire section from the mounting nut 126 to the upper end of the rod 131 has an electrical length of one-quarter wavelength in the CB frequency range.

Where the antenna is to receive FM in addition to CB and tire pressure monitoring frequencies, the overall length of the wire 130 includes a tightly wound loading coil 120 at the top of the antenna as well as a wire section 121 extending between the loading coil 120 and an FM self-resonant circuit 122. In the FM self-resonant circuit 122 the successive turns of the wire 130 are immediately adjacent each other. The successive turns of the wire 130 are spaced apart in the area 123 between the FM self-resonant circuit 122 and a tire pressure monitoring self-resonant circuit 124. In the tire pressure monitoring self-resonant circuit 124, as in the FM self-resonant circuit 122, the successive turns of the wire 130 are disposed immediately adjacent each other. The electrical length of the wire section from the mounting nut 126 to the lower end of the FM self-resonant circuit 122 has an electrical length of one-quarter wavelength in the FM frequency range. The wire section between the tire pressure monitoring self-resonant circuit 124 and the mounting nut 126 has an electrical length of one-quarter wavelength in the tire pressure monitoring frequency range, which in this embodiment is about 7 inches.

Figure 2:
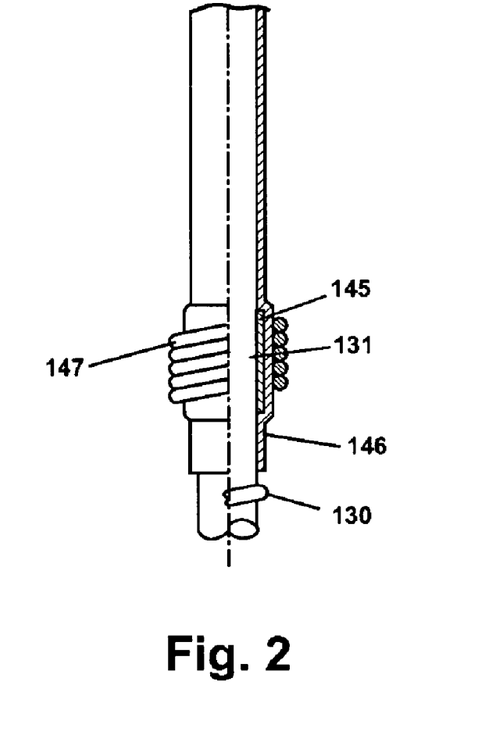
FIG. 2 is a partially cutaway view of a self-resonant circuit in accordance with the invention.

FIG. 2 shows one embodiment of the tire pressure monitoring self-resonant circuit 124 in partial cut away. Shown in FIG. 2 is a section of the fiberglass core 131 around which the antenna wire 130 is wound. In the area of the tire pressure monitoring self-resonant circuit 124, the antenna wire is wound to form a coiled section 147 with the successive turns of the coil immediately adjacent one another. A thin walled brass tube 145 is extended over the core 131 with its horizontal centerline at the electrical length from the lower end of the antenna equivalent to one-quarter wavelength in the tire pressure monitoring frequency range, at approximately 433 MHz, for example. A thin dielectric film 146 is applied over the exterior surface of the tube 145 and the antenna wire 130 is tightly wound over the dielectric film.

Figure 3:
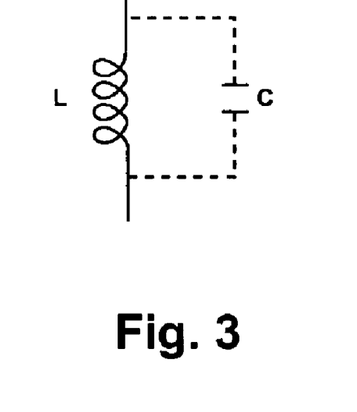
FIG. 3 is an equivalent circuit representation of the self-resonant circuit of FIG. 2.

FIG. 3 shows an equivalent circuit of the tire pressure monitoring self-resonant circuit 124 which includes an inductance L introduced by the tightly wound coiled section 147 and a capacitance C resulting from the tube 145 disposed within the coiled section and separated from the coiled section 147 by the dielectric 146. There is no direct electrical connection between the antenna wire 130 and the tube 145 and the capacitance between the antenna wire 130 and the tube 145 is essentially only stray capacitance. For this reason, the connections between the coil L and capacitor C, in FIG. 3, are shown in the form of dotted lines.

An antenna incorporating a tire pressure monitoring self-resonant circuit in accordance with the invention may be readily constructed by sliding the metallic tube, having an inner diameter slightly larger than the core, over the core and taping a thin layer of dielectric material over the core prior to coiling the antenna wire on the core. In one particular embodiment of the invention, the brass tube 145 is approximately ⅜ inches long and has walls that are 0.012 inches thick. The dielectric film in this particular embodiment is a single-layer Kapton® film with a thickness in the range of 0.002 to 0.004 inches. The antenna wire 130 may be a 20-gauge, enamel-coated wire or the like which is tightly wound to form the coiled section 147 with on the order of 3 to 5 turns over the ⅜ inch length of the tube 145. This arrangement has been found to be self resonating at approximately 433 MHz. The dimensions of the tube and dielectric and the antenna wire as well as the number of turns in the coiled section 147 clearly can be varied and adjusted by one skilled in the art to obtain the resonance at the desired frequency and the above-noted dimensions are provided only as an exemplary embodiment.

Figure 4:
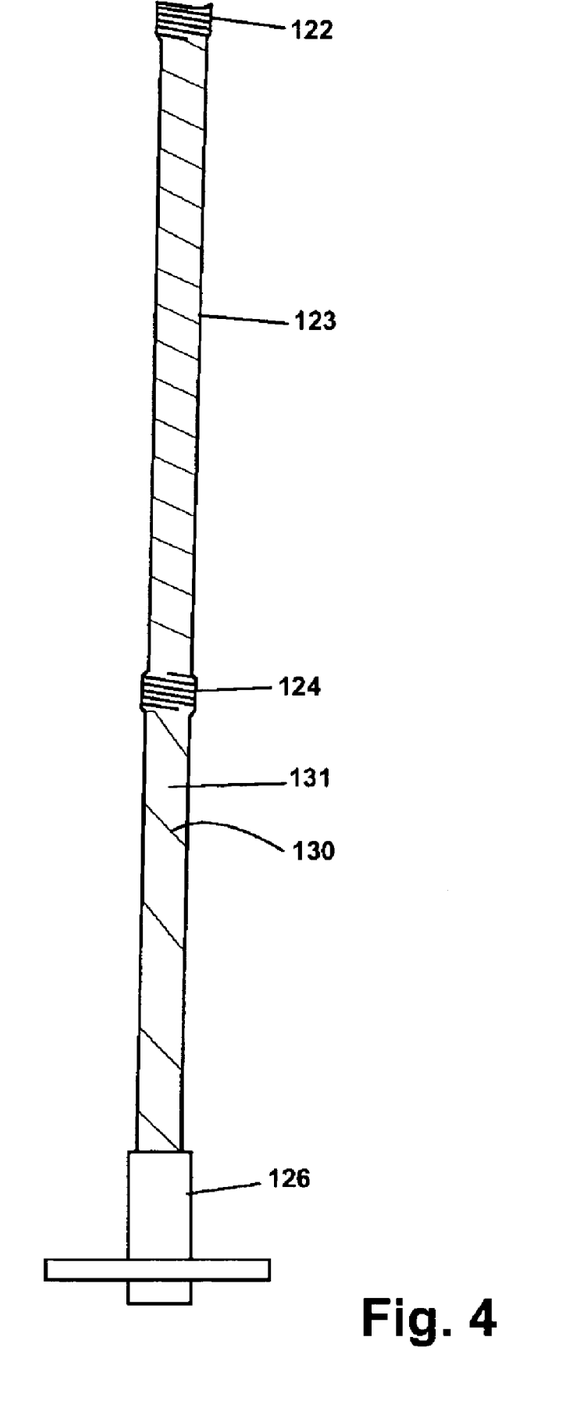
FIG. 4 is an enlarged breakaway view of the tire pressure monitoring portion of the antenna of FIG. 1.

FIG. 4 is an enlarged view of the lower section of the antenna 102 showing the portion of the antenna below the FM self-resonant circuit 122. Successive turns of the wire 130 below the FM self-resonant circuit 122 are wound around core 131 with approximately three inches per revolution and above the FM self-resonant circuit 122 are wound around the core 131 with approximately 1 to 1.5 inches per revolution. The FM self-resonant circuit 122 consists of 35 to 40 turns of the enamel coated wire 130 with successive turns of the wire disposed immediately adjacent one another and wound on the core 131 over a 2 inch tubular section and dielectric such as employed in the tire pressure monitoring self-resonant circuit 124, as shown in FIG. 2.

The adjacent turns of the wire 130 in the tire pressure monitoring self-resonant circuit 124 provide sufficient stray capacitance at the tire pressure monitoring frequencies to form an LC circuit, which resonates at tire pressure monitoring frequencies. In this manner, the upper portion of the antenna above the tire pressure monitoring self-resonant circuit is isolated from the tire pressure monitoring part of the antenna. As an alternative to the use of a conductive tubular sleeve, it has been found that 7–10 turns of the wire 130, tightly wound with adjacently touching coils will accomplish the same sort of L-C circuit to resonate at the 433 MHz frequency.

To obtain sufficient length for the tire pressure monitoring antenna for appropriate signal reception, the wire 130 in the tire pressure monitoring area could be essentially a straight wire. However, to facilitate manufacture of the combined multiband antenna, the wire 130 is wound around the core 131 in the tire pressure monitoring area with adjacent windings spaced apart by a convenient distance. In the manufacturing process, the wire 130 is wound around the core 131 while controlling the number of windings per unit length in the various different sections of the antenna. Allowing the wire in the tire pressure monitoring antenna portion to be wound around the core, allows the antenna to be manufactured by a single wire winding operation while varying the pitch of the wire in the various areas on the core. The overall length of the antenna is typically 54 inches. To provide sufficient electrical length of the antenna wire 130 for a quarter wavelength antenna in the CB frequency range, the wire is wound in a loading coil 120.

Figure 5:
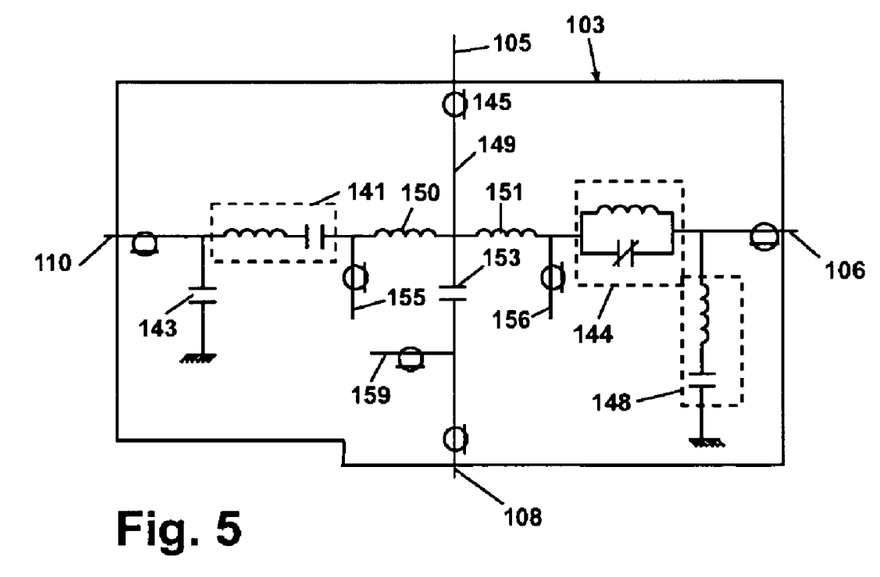
FIG. 5 is a circuit diagram of the multiplexer of FIG. 1.

FIG. 5 schematically shows the circuit of the multiplexer 103, which provides an interface to the CB transceiver 111 via conductor 110, to AM/FM receiver 107 via conductor 106 and to the tire pressure monitoring equipment 109 via conductor 108. The series LC circuit 141 offers low impedance to the CB signal and high impedance to the AM/FM signal so as not to load the AM/FM receiver. The parallel LC circuit 144 provides high impedance at 27 MHz, thereby isolating the CB transmitter from the AM/FM receiver. A pair of coils 150, 151 connected to node 149, at which the antenna conductor 105 is joined, provides high impedance to signals in the tire pressure monitoring frequency range. In this manner, the tire pressure monitoring frequency signals and AM/FM signals are blocked from the CB transceiver 111 and tire pressure monitoring frequency and CB signals are blocked from the AM/FM receiver 107. A capacitor 153 is connected between the node 149 and conductor 108 connected to the tire pressure monitoring equipment 109. The capacitor 153 provides high impedance at the CB and AM/FM frequencies and low impedance at the tire pressure monitoring frequencies, which isolates the tire pressure monitoring equipment 109 from CB and AM/FM signals. The inductors 150, 151 are self resonant at approximately 433 MHz to maintain a high impedance for tire pressure monitoring frequency signals so as to isolate the tire pressure monitoring signals from the CB and AM/FM radios and may not be needed in all installations. The capacitor 153 blocks the lower frequencies from the tire pressure monitor and offers a low impedance to tire pressure monitoring frequencies when the capacitor is connected in series with an inductor having sufficient inductance to resonate the capacitor at the desired frequency (in this embodiment, approximately 433 MHz). The series LC circuit 148 serves to shunt any CB signal passing through or bypassing the circuit 144 to ground. The capacitor 143 aids in matching the antenna to the CB transceiver 111. The conductors 105, 106, 108 and 110 are preferably coaxial conductors. Referring again to FIG. 5, a coaxial stub 155 is shown connected between the LC circuit 141 and the coil 150. Similarly coaxial stub 156 is shown connected between the coil 151 and the LC circuit 144. The two open, quarter-wavelength coaxial stubs 155, 156 present low impedance at the tire pressure monitoring frequencies thereby providing additional isolation, if needed. A shorted coaxial stub 159 having an electrical length of one-quarter wavelength of signals in the tire pressure monitoring frequency range provides low impedance to AM/FM and CB signals to further isolate the tire pressure monitoring radio apparatus from these signals.

Figure 6:
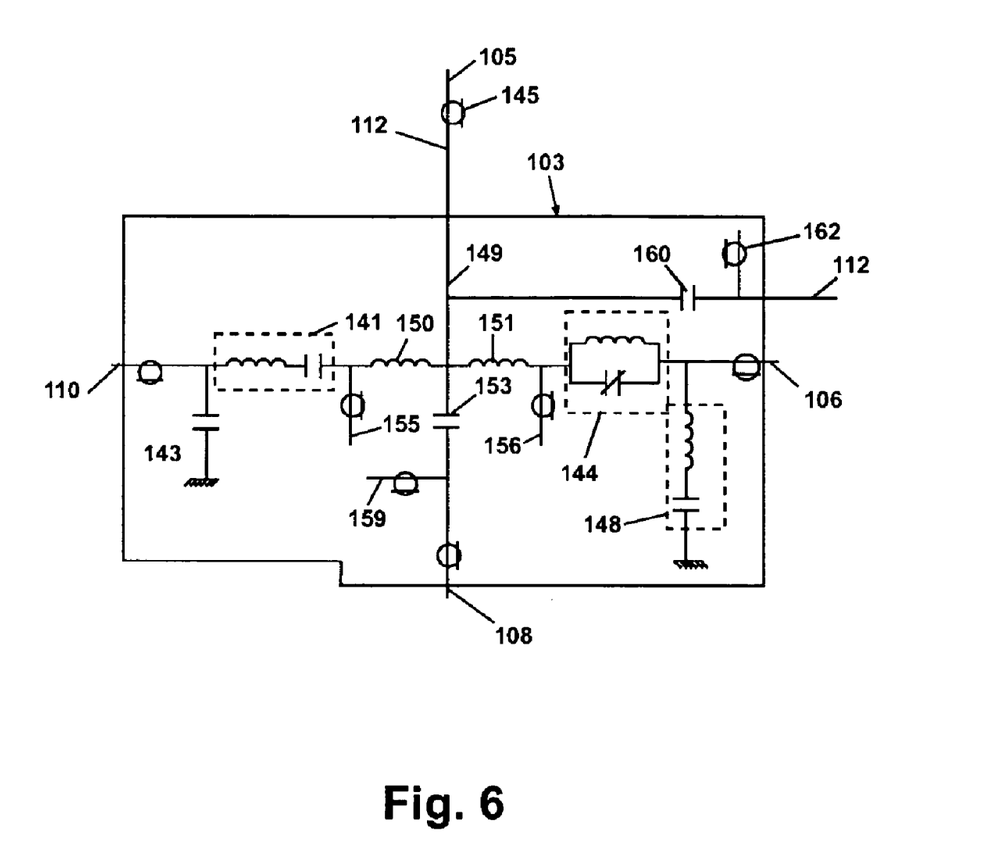
FIG. 6 is a circuit diagram representation of an alternate embodiment of the multiplexer of FIG. 1.

The circuit diagram of FIG. 6 is similar to that of FIG. 5 and further includes a conductor 112 for connecting to cellular telephone apparatus (not shown) typically operating in the cellular telephone frequency spectrum, e.g. frequencies around 825–890 MHz. Here, the trap 124 is set for 433 MHz, and consequently, the performance in the cellular telephone frequency ranges is less than optimal, but nevertheless acceptable. A capacitor 160 is connected between the node 149 and conductor 112 connected to the cellular telephone apparatus. The capacitor 160 blocks the lower frequencies from the cellular telephone apparatus and offers low impedance to cellular telephone frequencies when the capacitor is connected in series with an inductor having sufficient inductance to resonate the capacitor at the desired cellular telephone frequencies. As an alternative, the trap 124 can be set to resonate at a desired cellular telephone frequency, but the performance in the tire pressure monitoring frequencies will be less than optimal. It will be understood that some combination of both alternatives may also be established in a mutual performance trade-off.

Figure 7:
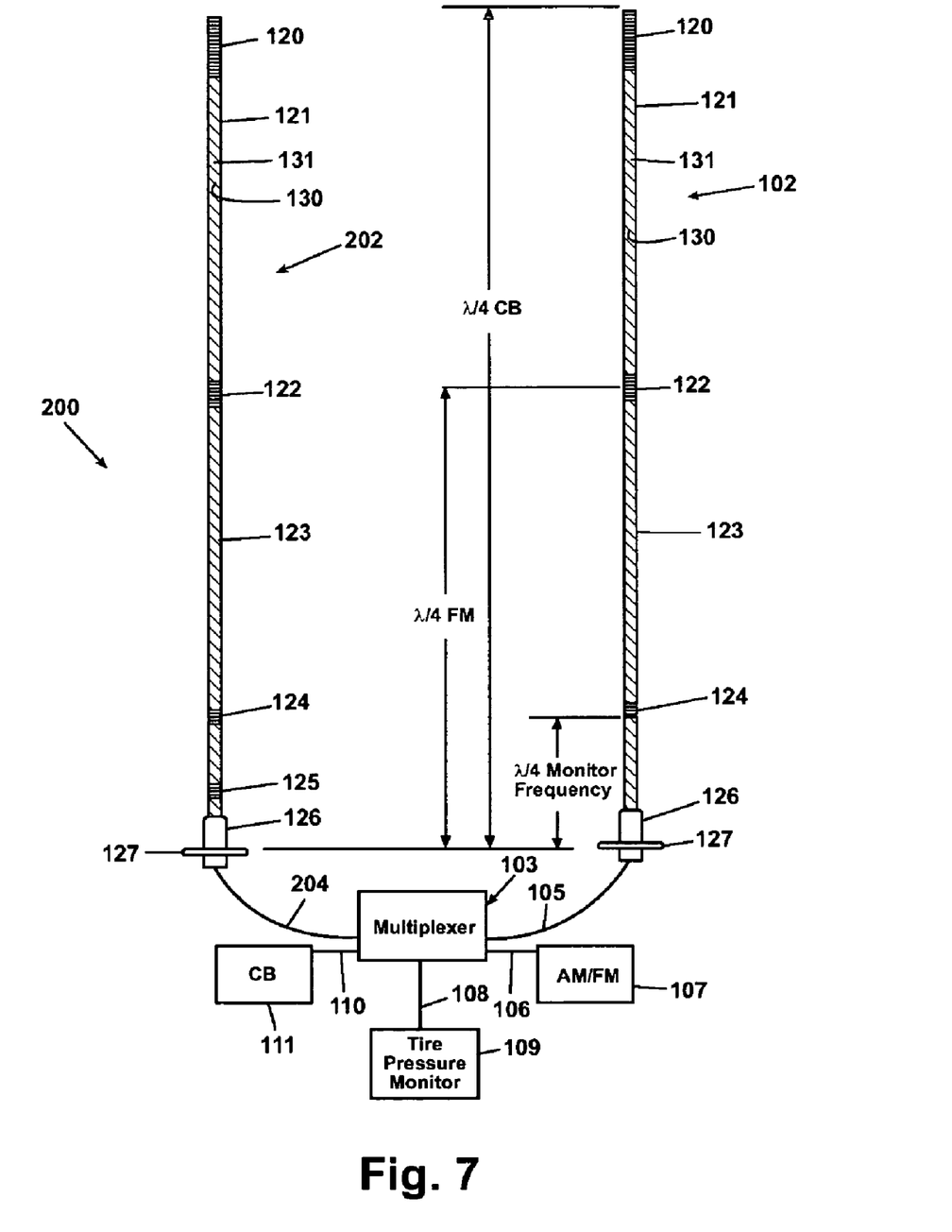
FIG. 7 is a diagrammatic representation of a dual multiband antenna system incorporating the principles of the invention.
Figure 8:
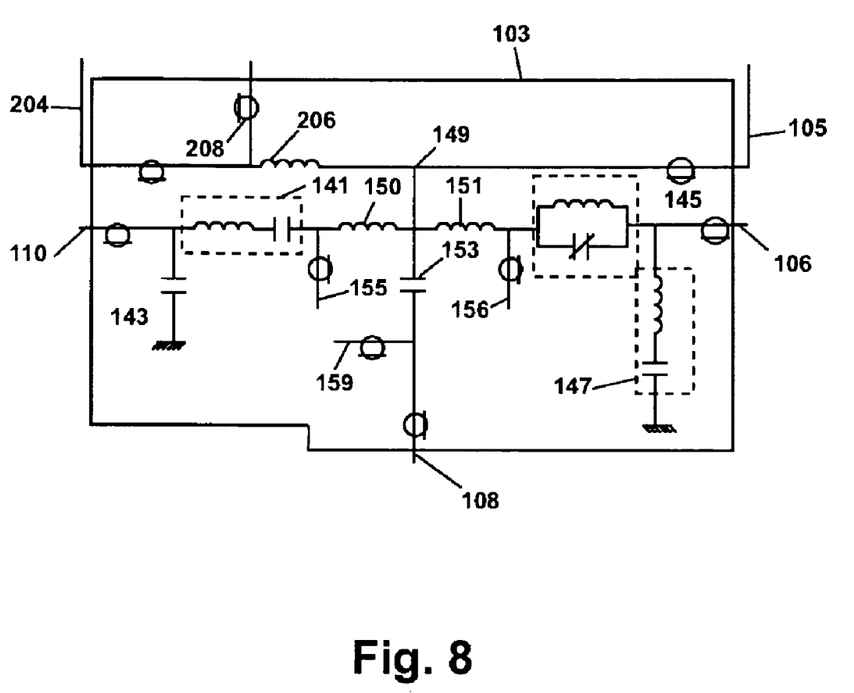
FIG. 8 is a circuit diagram of the multiplexer of FIG. 8.

FIGS. 7 and 8 illustrate an embodiment of an antenna system 200 according to the invention similar in most respects to the system 100 described in FIG. 1, where like numerals will identify like components. A second antenna 202, identical to the antenna 102 is connected to the multiplexer 103 via a conductor 204 at node 149. To further isolate the tire pressure monitoring frequencies, an inductor 206 that is self-resonant at the tire pressure monitoring frequencies can be connected between the conductor 204 and the node 149. Yet further isolation can be achieved with an open coaxial stub 208 of one quarter wavelength at a tire pressure monitoring frequency connected to the conductor 204.

The invention claimed is:

1. A multiband antenna comprising:
a terminating end connectable to transmitter/receiver apparatus and a distal end opposite the terminating end;
a solid core wire extending between the terminating end and the distal end and having an overall electrical length equivalent to one-quarter wavelength of a frequency in a predetermined frequency range lower than a tire pressure monitoring frequency range;
a tire pressure monitoring frequency self-resonant circuit section disposed a predetermined distance from the terminating end such that a portion of the solid core wire between the tire pressure monitoring frequency self-resonant circuit section and the terminating end has an electrical length equivalent to one-quarter wavelength in the tire pressure monitoring frequency range; and
the tire pressure monitoring frequency self-resonant circuit section comprising, in combination, a portion of the solid core wire formed into a multiple-turn coiled section wherein the self-resonant circuit section has a signal blocking impedance at a tire pressure monitoring frequency defined by an inductive component provided by turns of the respective multiple-turn coiled section and a capacitive component provided by stray capacitance across the turns of the respective multiple-turn coiled section;
whereby when the antenna is connected to a multiplexer on a vehicle equipped with a wireless tire pressure monitor apparatus transmitting in the tire pressure monitoring frequency range, the antenna will optimally receive and conduct signals in both the tire pressure monitoring frequency range and the lower frequency range.

2. An antenna according to claim 1 further comprising a second self-resonant circuit section disposed between the distal end and the tire pressure monitoring frequency self-resonant circuit section such that a portion of the solid core wire between the second self-resonant circuit section and the terminating end has an electrical length equivalent to one-quarter wavelength in the FM frequency range.

3. An antenna according to claim 1 wherein the multiple-turn coiled section of the tire pressure monitoring frequency self-resonant circuit section comprises 7–10 turns.

4. An antenna according to claim 1 wherein a layer of conductive material is disposed internal of the multiple-turn coiled section of the tire pressure monitoring frequency self-resonant circuit section and a layer of dielectric material is disposed between the layer of conductive material and the multiple-turn coiled section.

5. An antenna according to claim 4 wherein the multiple-turn coiled section of the tire pressure monitoring frequency self-resonant circuit section comprises 3–5 turns.

6. A multiband antenna system for installation in a vehicle comprising:
An antenna having a terminating end connectable to transmitter/receiver apparatus and a distal end opposite the terminating end;
a solid core wire extending between the terminating end and the distal end and having an overall electrical length equivalent to one-quarter wavelength of a frequency in a CB frequency range;
a tire pressure monitoring frequency self-resonant circuit section disposed a predetermined distance from the terminating end such that a portion of the solid core wire between the tire pressure monitoring frequency self-resonant circuit section and the terminating end has an electrical length equivalent to one-quarter wavelength in the tire pressure monitoring frequency range;
the tire pressure monitoring frequency self-resonant circuit section comprising, in combination, a portion of the solid core wire formed into a multiple-turn coiled section wherein the self-resonant circuit section has a signal blocking impedance at a tire pressure monitoring frequency defined by an inductive component provided by turns of the respective multiple-turn coiled section and a capacitive component provided by stray capacitance across the turns of the respective multiple-turn coiled section; and
transmitter/receiver apparatus comprising CB radio apparatus and tire pressure monitoring apparatus and a multiplexer circuit for selectively coupling the antenna to the CB radio apparatus and the tire pressure monitoring apparatus, the multiplexer circuit comprising an input conductor connected to the antenna, a first output conductor for connection to the CB radio apparatus and a second output conductor for connection to the tire pressure monitoring apparatus, the multiplexer circuit further comprising at least one L-C circuit connected between the input conductor and the first output conductor and between the first and second output conductors to effectively isolate signals in the CB frequency range and the tire pressure monitoring frequency range from each other.

7. The antenna system of claim 6 wherein the antenna further comprises a second self resonant circuit section disposed between the distal end and the tire pressure monitoring frequency self-resonant circuit section such that a portion of the solid core wire between the second self-resonant circuit section and the terminating end has an electrical length equivalent to one-quarter wavelength in the FM frequency range and wherein the multiplexer circuit has a third output conductor for connection to AM/FM radio apparatus and a series L-C circuit connected between the input conductor and the first output conductor providing blocking impedance to signals in the AM/FM frequency range.

8. The antenna system in accordance with claim 7 comprising a parallel L-C circuit connected between the input conductor and the third output conductor for blocking signals in the CB frequency range and an additional inductor connected in series with the parallel L-C circuit for blocking signals in the tire pressure monitoring frequency range.

9. The antenna system in accordance with claim 6 and further comprising a second antenna identical to the first, the second antenna being connected to the multiplexer circuit via a second input conductor with an inductor connected between the second antenna and the respective input conductor for blocking signals in the tire pressure monitoring frequency range from the second antenna.

10. A multiplexer circuit for selectively coupling an antenna to CB radio apparatus and to FM radio apparatus and to tire pressure monitoring apparatus, the multiplexer circuit comprising:
   an input conductor for connection to the antenna;
   a first output conductor for connection to a CB radio apparatus;
   a second output conductor for connection to a AM/FM radio apparatus;
   a third output conductor for connection to a tire pressure monitoring apparatus; and
   a series L-C circuit connected between the input conductor and the first output conductor and comprising a first inductor and a first capacitor connected in series and providing a blocking impedance to signals in the AM/FM range.

11. The multiplexer circuit in accordance with claim 10 and further comprising a parallel L-C circuit connected between the input conductor and the second output conductor for blocking signals in the CB frequency range and an additional inductor connected in series with the parallel L-C circuit for blocking signals in the tire pressure monitoring frequency range.

12. The multiplexer circuit in accordance with claim 11 and further comprising a capacitor connected between the input conductor and the third output conductor for blocking lower frequency signals in the CB and FM frequency ranges.

* * * * *